(12) United States Patent
Shibata

(10) Patent No.: US 7,231,111 B2
(45) Date of Patent: Jun. 12, 2007

(54) TUNABLE DISPERSION COMPENSATOR

(75) Inventor: Kohei Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/899,003

(22) Filed: Jul. 27, 2004

(65) Prior Publication Data

US 2005/0220400 A1   Oct. 6, 2005

(30) Foreign Application Priority Data

Mar. 31, 2004   (JP)   ............................. 2004-102696

(51) Int. Cl.
    *G02B 6/26*   (2006.01)
(52) U.S. Cl. ............................................. 385/27
(58) Field of Classification Search .................. 385/27
    See application file for complete search history.

(56) References Cited

U.S. PATENT DOCUMENTS

| 5,747,807 | A  | * | 5/1998  | Atkinson et al. | ...... 250/339.13 |
| 5,969,865 | A  | * | 10/1999 | Shirasaki | ..................... 359/577 |
| 6,441,959 | B1 | * | 8/2002  | Yang et al. | .................. 359/495 |
| 6,522,476 | B2 | * | 2/2003  | Koreeda | ....................... 359/681 |
| 6,668,115 | B2 | * | 12/2003 | Lin et al. | ...................... 385/37 |
| 6,671,295 | B2 | * | 12/2003 | Gutin | ........................... 372/20 |
| 6,744,991 | B1 | * | 6/2004  | Cao | ............................. 398/147 |
| 6,807,008 | B2 | * | 10/2004 | Mitamura | .................... 359/577 |
| 6,909,537 | B2 | * | 6/2005  | Kawahata et al. | ........ 359/337.5 |
| 7,019,883 | B2 | * | 3/2006  | Moon et al. | ................. 359/290 |
| 2003/0128431 | A1 | * | 7/2003 | Mitamura et al. | .......... 359/577 |
| 2003/0185504 | A1 |   | 10/2003 | Yamauchi et al. |

FOREIGN PATENT DOCUMENTS

| JP | 2000-511655 | 9/2000 |
| JP | 2001-313607 | 11/2001 |
| JP | 2002-514323 | 5/2002 |
| JP | 2003-29168 | 1/2003 |

OTHER PUBLICATIONS

Neislon, David T., et al., "Channelized Dispersion Compensator with Flat Pass Bands Using an Array of Deformable MEMS Mirrors", PD29-1 through PD29-3, yr. 2003, no month.

T. Sano et al., "Novel Multichannel Tunable Chromatic Dispersion Compensator Based on MEMS and Diffraction Grating," IEEE Photonics Technology Letters IEEE USA, Aug. 2003, pp. 1109-1110.

M. Shirasaki, "Compensation of Chromatic Dispersion and Dispersion Slope Using a Virtually Imaged Phased Array," Optical Fiber Communication Conference, Technical Digest Post-Conference Edition, Trends in Optics and Photonics Series, Mar. 2001, pp. TuS1-1-TuS1-3.

(Continued)

*Primary Examiner*—Ellen E. Kim
(74) *Attorney, Agent, or Firm*—Staas & Halsey LLP

(57) ABSTRACT

A tunable dispersion compensator includes a collimating unit that collimates an incident light to output a parallel light, a parallel shifting unit that spatially shifts the parallel light from the collimating unit within a predetermined range, and an optical-path-length providing unit that provides optical path length of light corresponding to a position at which light output from the parallel shifting unit is input.

16 Claims, 9 Drawing Sheets

OTHER PUBLICATIONS

European Search Report and Annex of Application No. EP 04 01 7967 dated Jul. 14, 2005.

Harumoto, Michiko, et al., "Principle of Tunable Chromatic Dispersion Compensators Utilzing Diffraction Grating & Curvature Mirrors", Sumitomo Electric Industries, Ltd., Yokohama, Japan, distributed by CD Rom data, ECOC-I00C 2003, 29th European Conference on Optical Communication 14th International Conference on Integrated Optics and Optical Fibre Communication, Sep. 21-25, 2003, Rimini, Italy.

* cited by examiner

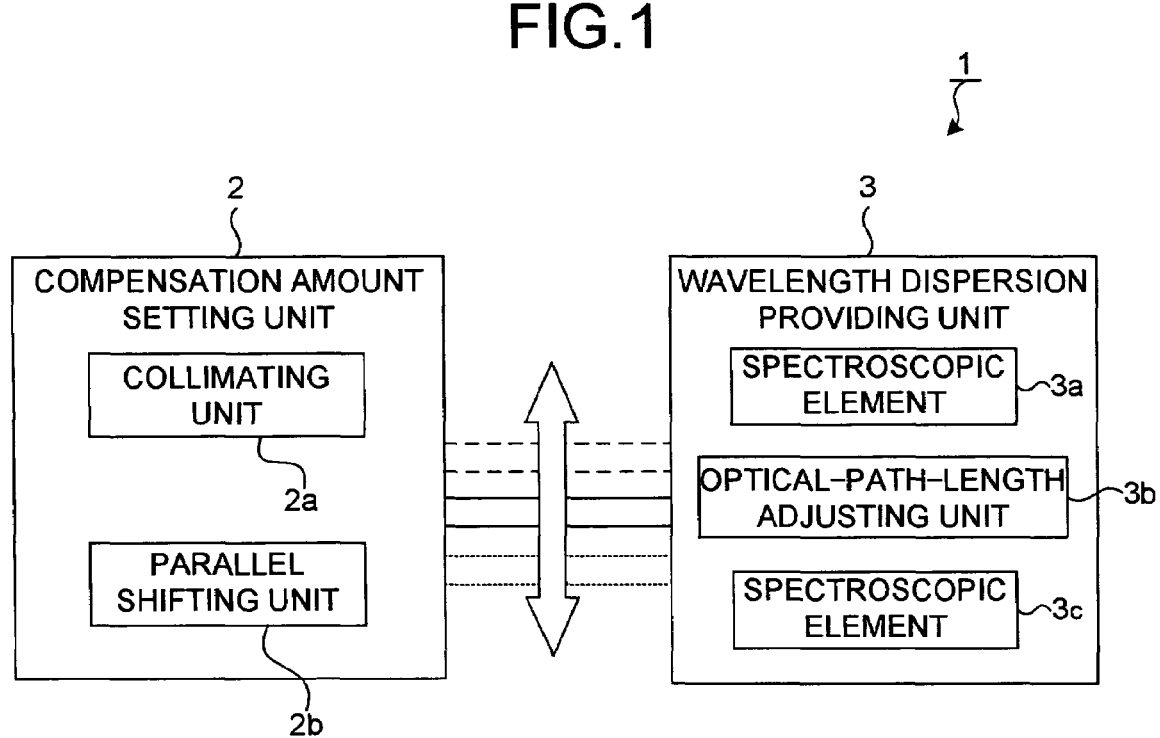
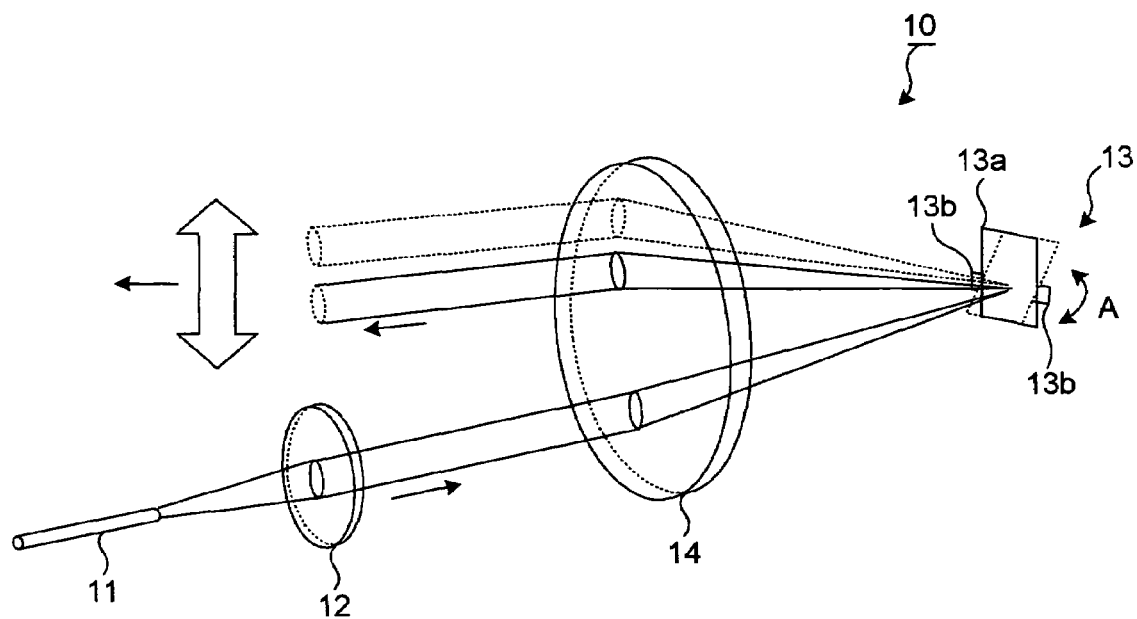

TUNABLE DISPERSION COMPENSATOR

CROSS-REFERENCE TO RELATED APPLICATIONS

This application is based upon and claims the benefit of priority from the prior Japanese Patent Application No. 2004-102696, filed on Mar. 31, 2004, the entire contents of which are incorporated herein by reference.

BACKGROUND OF THE INVENTION

1) Field of the Invention

The present invention relates to a technology for compensating wavelength dispersion in optical fiber transmission.

2) Description of the Related Art

Conventionally, in optical signal pulse transmission using an optical fiber, the transmission speed in the fiber varies according to the wavelength. Therefore, as the transmission distance extends, the signal pulse wave becomes blunt. This phenomenon is called wavelength dispersion, which significantly degrades the reception level. For example, in single mode fiber (SMF), wavelength dispersion of 15–16 ps/nm/km occurs near a wavelength of 1.55 micrometers. One of the ways of compensating such wavelength dispersion is to apply an inverse wavelength dispersion of the same amount.

Currently, a dispersion compensating fiber (DCF) is widely used for the dispersion compensation. The DCF is designed to cause dispersion (structure dispersion) reverse to material dispersion of fiber material through special refractive index profile, thereby causing an inverse dispersion characteristic with respect to normal SMF (dispersion compensation of five to ten folds with respect to SMF of the same length). The DCF is connected to a transmission path fiber, such as an SMF, at a relay station, to eventually eliminate the dispersion.

FIG. 12 is a graph for explaining wavelength dispersion compensation and residual dispersion. The horizontal axis represents wavelength λ (nanometer), and the vertical axis represents wavelength dispersion (ps/nm). An optical wavelength range called C-band is 1525 nanometers to 1565 nanometers (No. 1Ch to No. 40Ch (channels). A characteristic line 1201 of an optical fiber (SMF) in single mode, a characteristic line 1202 of a DCF, and a characteristic line 1203 after dispersion compensation of the SMF by using the DCF are shown. Dispersion compensation using the DCF has the dependence of a dispersion characteristic on wavelength, which is called a dispersion slope. This wavelength dependence differs between the DCF and the transmission path fiber. Dispersion compensation using the DCF is performed with reference to a center wavelength for use in the SMF (in FIG. 12, near 1545 nanometers).

At both ends (near 1525 nanometers and near 1565 nanometers) of the optical wavelength range of the wavelength band (C-band) used in optical transmission in wavelength division multiplexing (WDM), wavelength dispersion that cannot be compensated occurs (residual dispersion represented by a value of N). Also, with an optical network route being able to be reconstructed (being reconfigurable), when a different type of a transmission path fiber is used for each route or an end-to-end transmission distance is changed, this residual dispersion value is varied with time. Therefore, it would be difficult to perform dispersion compensation in a reconfigurable WDM network with a DCF whose compensation value is fixed. Thus, a unit that compensates wavelength dispersion of a plurality of channels in a tunable manner at a high speed is desired.

The structure that tunably provides wavelength dispersion can be implemented in a spatial light system, which can be designed at a high degree of flexibility. As a principle of occurrence of wavelength dispersion, there is a scheme of causing light to pass twice through light distributing elements (for example, diffraction gratings, prisms, virtually-imaged-phased-array (VIPA) plates) that provide different angular dispersion for each wavelength.

FIG. 13 is a schematic for illustrating a principle of dispersion compensation using diffraction gratings. A light through an optical fiber 1301 at an input side is output to two diffraction gratings 1303 and 1304 via a collimate lens 1302. The diffraction gratings 1303 and 1304 are placed in parallel so that their grating surfaces are opposed to each other. The light is dispersed at the diffraction grating 1303, with its light at a short wavelength side passing through an optical path A1 and its light at a long wavelength side passing through an optical path A2 to the diffraction grating 1304.

Light A1 at the short wavelength side and light A2 at the long wavelength side output from this diffraction grating 1304 become parallel, and is then converged by a collimate lens 1305, thereby causing an optical path length difference (A1–A2). This optical path length difference causes wavelength dispersion, which is input to an optical fiber 1306 at an output side. By adjusting a distance between the two diffraction gratings 1303 and 1304, the amount of the caused wavelength dispersion can be varied. Other than that, although not shown, inverse dispersion can be provided by adjusting arrangement of the two diffraction gratings. To get a large amount of wavelength dispersion compensation, it is necessary to use light distributing elements having a large dispersion angle and to make a distance between the light distributing elements long.

To make the amount of wavelength dispersion tunable, the distance between the two light distributing elements is changed. Other than that, the two light distributing elements are provided therebetween with a unit that adjusts the optical path length (optical-path-length adjusting unit) to make the amount of wavelength dispersion tunable. For example, a structure is assumed such that light passes through one light distributing element, the optical path length adjusting unit, and then the other light distributing element in this order. In one example, light is reflected on a light distributing element by using a mirror as this optical path length adjusting unit, thereby achieving compensation of wavelength dispersion with a single optical light distributing element (for example, see Japanese National Phase PCT Laid-Open Publication No. 2000-511655 and Japanese National Phase PCT Laid-Open Publication No. 2002-514323).

FIG. 14 is a perspective view of a tunable dispersion compensator according to a first example of the conventional technology. This tunable dispersion compensator 1400 includes an input/output optical fiber 1401, a collimate lens 1402, a focusing lens 1403, a VIPA plate 1404 as a light distributing element (for example, see Japanese National Phase PCT Laid-Open Publication No. 2000-511655), a focusing lens 1405, and a free surface mirror 1406. The amount of compensation of wavelength dispersion is determined by the shape at an incident point of light incident on the free surface mirror 1406. The free surface mirror 1406 has a mirror surface 1406a curved and continuously varied with its upper portion forming a concave surface and its lower portion gradually forming a convex surface. This free surface mirror 1406 is shifted perpendicularly to a light distributing direction of the VIPA plate 1404, thereby variably setting the amount of compensation.

In the tunable dispersion compensator 1400 shown in the first example of the conventional technology, periodicity occurs in the compensation characteristic from the light distribution characteristic of the VIPA plate 1404. For use in WDM transmission, a channel interval is designed according to this period. Therefore, since the amount of compensation for every channel has the same value, a structure for dispersion compensation has to be separately required for each channel.

FIG. 15 is a schematic of a structure for achieving dispersion compensation for a plurality of channels. This is an example structure when the tunable dispersion compensator 1400 shown in FIG. 14 is used. After the wavelength of each channel in WDM transmission is demultiplexed by a wavelength demultiplexer (DEMUX) 1501, tunable dispersion compensators (denoted as VIPA1 through VIPAn) are provided correspondingly to the number n of required channels (Ch) for output to reception side devices (Rx1 through Rxn) 1502. As shown in the drawing, to achieve dispersion compensation of the plurality of channels by using the tunable dispersion compensators 1400 of the first example of the conventional technology, light has to be dispersed in advance at channel intervals, and also a large number of tunable dispersion compensators 1400 corresponding to the channels have to be connected, thereby requiring high dispersion compensation cost.

To get around the problem, a channel-by-channel (Ch-by-Ch) tunable dispersion compensator that achieves dispersion compensation of a plurality of channels with a single module is desired.

FIG. 16 is a perspective diagram of a tunable dispersion compensator according to a second example of the conventional technology. The components identical to those shown in FIG. 14 are provided with the same signs. A tunable dispersion compensator 1600 has a Ch-by-Ch-support structure. Compared with the structure of FIG. 14, a transmission diffraction grating 1601 is provided at a stage subsequent to the VIPA plate 1404. A transmission diffraction grating 1601 wavelength-demultiplexes light at channel intervals in a direction (in the drawing, vertical direction) perpendicular to a light distributing direction (horizontal direction) of the VIPA plate 1404. Also, a non-flat surface mirror 1602 includes a plurality of mirrors 1602*a* through 1602*n* arranged in the vertical direction in the drawing. These plurality of mirrors 1602*a* through 1602*n* are provided correspondingly to the number of channels n, and are structured so that their shapes can be changed to a concave shape or a convex shape separately from each other for each channel (for example, see Japanese Patent Laid-Open Publication No. 2003-29168).

In the non-flat mirror 1602, the mirrors 1602*a* through 1602*n* are made of elastically deformable material. A plurality (for example, approximately three for forming a channel compensation profile) of small actuators not shown are connected to the back surfaces of the mirrors 1602*a* through 1602*n*, and then these actuators are set so as to be operated to cause the curved surfaces of the mirrors 1602*a* through 1602*n* to each have an arbitrary shape.

However, in the technology according to the second example of the conventional technology, the shapes of the mirrors 1602*a* through 1602*n* of the non-flat mirror 1602 are changed to make the amount of compensation tunable. Therefore, it is difficult to maintain the shapes of the mirrors 1602*a* through 1602*n* for a long time because the material forming the mirrors is fatigued, deteriorated with time, or the like. If the mirrors 1602*a* through 1602*n* are not deformed to have desired shapes, a group delay ripple or the like will occur, thereby degrading a reception level. Moreover, the states of deformation of the mirrors 1602*a* through 1602 have to be detected for all channels. Therefore, a special detecting mechanism has to be required, thereby increasing cost.

Furthermore, the conventional technology is structured such that the diffraction grating 1601 is used for angular dispersion by channel. Therefore, to suppress the occurrence of a group delay ripple or the like, a high degree of processing accuracy is required for finely (with an accuracy of nanometers or higher) forming the curved surfaces of the mirrors 1602*a* through 1602*n*. Alternatively, to ensure a sufficient accuracy, the distance between the mirrors 1602*a* through 1602*n* and the diffraction grating 1601 has to be set long. In this case, the module is disadvantageously large in size.

At this point, according to the technology of the first example of the conventional technology, the free surface mirror 1406 has a fixed shape, and therefore the problems of the second example of the conventional technology described above do not occur. In the technology of the first example of the conventional technology, however, there is a problem that the amount of wavelength dispersion compensation cannot be set for each channel separately. Moreover, to make the amount of compensation tunable, the entire free surface mirror 1406 has to be shifted, thereby making it impossible to quickly perform an operation when the amount of compensation is changed.

SUMMARY OF THE INVENTION

It is an object of the present invention to solve at least the above problems in the conventional technology.

The tunable dispersion compensator according to one aspect of the present invention includes a collimating unit that collimates an incident light to output a parallel light, a parallel shifting unit that spatially shifts the parallel light from the collimating unit within a predetermined range, and an optical-path-length providing unit that provides optical path length of light corresponding to a position at which light output from the parallel shifting unit is input.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a block diagram of a tunable dispersion compensator according to the present invention;

FIG. 2 is a perspective view of an example of a compensation amount setting unit;

DETAILED DESCRIPTION

Figure 3:
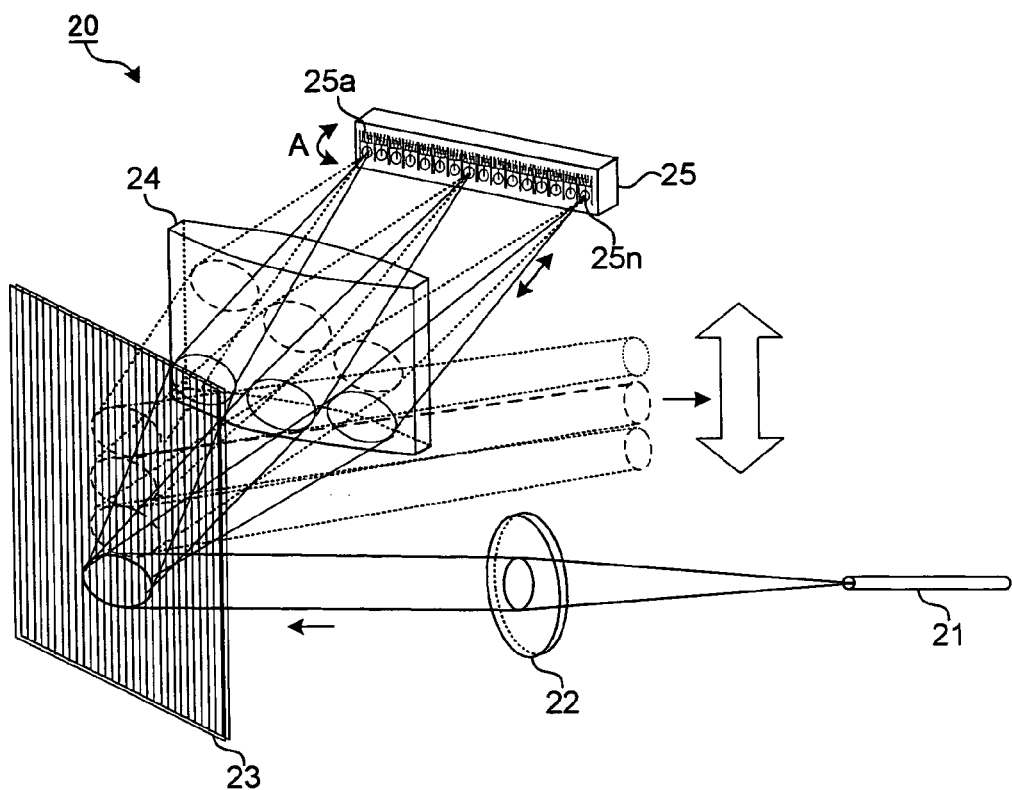
FIG. 3 is a perspective view of another example of the compensation amount setting unit.

Exemplary embodiment of a tunable dispersion compensator according to the present invention is described in detail below with reference to the accompanying drawings.

The present invention relates to a channel-by-channel (Ch-by-Ch) tunable dispersion compensator achieving dispersion compensation of a plurality of channels (Ch) with a single module. To achieve this Ch-by-Ch tunable dispersion compensator, the following three functions have to be satisfied as basic functions.

A first function is to allow a wavelength-multiplexed signal to be demultiplexed by channel. A second function is to allow the amount of compensation to be set for each channel. For example, the light traveling direction can be changed between a short wavelength side and a long wavelength side. A third function is to allow optical path difference to be continuously given between the short wavelength side and the long wavelength side within a wavelength range included in the channel.

In the present invention, to achieve the tunable dispersion compensator that compensates wavelength dispersion for each of a plurality of channels with a single module, the structure of the third function mentioned above is shared with the plurality of channels demultiplexed through the first function.

FIG. 1 is a block diagram of a tunable dispersion compensator according to the present invention. A tunable dispersion compensator 1 according to the present invention includes a compensation amount setting unit 2 and a wavelength dispersion providing unit 3. The compensation amount setting unit 2 has a collimating unit 2a, such as a lens, that outputs incident light (optical signal) as parallel light (for example, collimate light) in which energy is locally concentrated, and also has a parallel shifting unit 2b formed of an optical system allowing translation of an outputting position of the output light with respect to a light traveling direction. The parallel shifting unit 2b can be implemented by using a mechanical component, such as an automatic stage, that moves the optical system in parallel with respect to the light traveling direction. With this, the light output from the compensation amount setting unit 2 can be arbitrarily moved in parallel within a predetermined range and can be set at an arbitrary position.

An optical path length adjusting unit 3b separated from the unit that sets the amount of compensation is included in the wavelength dispersion providing unit 3 as its component. This wavelength dispersion providing unit 3 includes a light distributing element 3a, an optical path length adjusting unit 3b, and a light distributing element 3c, and is structured such that light passes through the light distributing element 3a, the optical path length adjusting unit 3b, and then the light distributing element 3c in this order. With the light distributing elements 3a and 3c being provided, the incident position of the optical path length adjusting unit 3b is varied with the incident light position of the light distributing element 2a. The optical path length adjusting unit 3b is structured so that a deflecting direction is varied for each incident position. That is, the light distributing element 3a is placed for wavelength dispersion so that the optical path length until returning to the light distributing element 3a of the long wavelength is different from that of the short wavelength. The light distributing element 3c causes the light dispersed by wavelength to be back to the original.

In this way, with the compensation amount setting unit 2 and the optical path length adjusting unit 3b being structurally separated, a component having a fixed shape can be used as the optical path length adjusting unit 3b. This makes it possible to prevent the compensation characteristic from being varied with time, and to ensure the reliability over a long time. Also, in the present structure, the amount of compensation is set not by a movement of a curved surface mirror but by a movement of the input light itself. This allows the amount of compensation to be quickly set and changed. Furthermore, this allows the amount of compensation to be set for each channel with a light traveling direction at the short wavelength side being differed from that at the long short wavelength side.

FIG. 2 is a perspective view of an example of a compensation amount setting unit. FIG. 2 depicts an exemplary structure in which light distribution by wavelength is not performed by a light distributing element and a compensation amount setting unit 10 is structured by using a single focusing lens.

An optical system of the compensation amount setting unit 10 includes a collimate lens 12, a tilt mirror 13, and a focusing lens 14. The collimate lens 12 causes input light through an optical fiber for light input and output to be parallel light. The tilt mirror 13 has a mirror surface 13a having a constant shape (flat surface). The mirror surface 13a is rotatable in a direction denoted as an arrow A in the drawing taking a horizontal center axis 13b as a center. The focusing lens 14 gathers parallel light at the tilt mirror 13, and also outputs light reflected and deflected by the tilt mirror 13 to the wavelength dispersion providing unit 3 as parallel light. The tilt mirror 13 can be implemented by a microelectromechanical systems (MEMS) technology. With a reflection angle of the light when the tilt mirror 13 is shifted, the amount of compensation can be set. The focusing lens 14 is implemented by using a narrow focusing lens designed at an infinite conjugate ratio.

According to the structure described above, the tilt mirror 13 can set the angle of the reflection surface by taking the axis 13b as the center. Therefore, with the deflecting function of moving this tilt mirror 13, the amount of compensation can be set. This tilt mirror 13 can be formed in a small size by using the MEMS forming technology, and inertia at the time of movement can be reduced, thereby allowing the angle setting to be performed at high speed for the required amount of compensation. In the structure of FIG. 2, the input light is converted to parallel light by the collimate lens 12, and is then brought by the focusing lens 14 designed at the infinite conjugate ratio to a focus on the tilt mirror 13. Then, the light is reflected by the tilt mirror 13 in an arbitrary angle direction corresponding to the required amount of compensation, and is then again converted by the focusing lens 14 to parallel light. At this time, since the focusing lens 14 is designed at the infinite conjugate ratio, light beams having different reflection angles can be optically output with its collimated relation being maintained.

FIG. 3 is a perspective view of another example of the compensation amount setting unit. An optical signal input in this example has been subjected to WDM. In this structure, the WDM optical signal is demultiplexed to a plurality of channels (Ch) with a single module to achieve channel-by-channel (Ch-by-Ch) dispersion compensation.

The compensation amount setting unit 20 includes an optical fiber 21 for input and output of optical signals, a collimate lens 22, a diffraction grating 23, a focusing lens 24, and integrated tilt mirrors 25. The diffraction grating 23 demultiplexes input light at specific wavelength intervals. The focusing lens 24 is designed at an infinite conjugate ratio with respect to angular dispersion of the diffraction grating 23. The integrated tilt mirror 25 is formed by integrating the tilt mirrors 13 described by using FIG. 2 in an array shape. In the example shown in the drawing, a plurality of tilt mirrors 25a through 25n corresponding to the number of channels is one-dimensionally arranged in a horizontal direction. As with FIG. 2, these integrated tilt mirrors 25 each rotate in an oscillating direction denoted by an arrow A in the drawing by taking a horizontal center axis as a center.

With the diffraction grating 23 that demultiplexes light for each channel being provided inside the compensation amount setting unit 20, the dispersion angle can be set separately from the light distributing element in the channel inside the wavelength dispersion providing unit 3. This can increase the processing accuracy required for optical path length adjustment by the wavelength dispersion providing unit, and also can increase the degree of flexibility in designing the setting of the amount of compensation.

The WDM optical signal converted by the collimate lens 22 to parallel light is demultiplexed (optically dispersed) by the diffraction grating 23 so as to have a different angle by wavelength. A direction for this demultiplexing is a horizontal direction in the drawing. The light output from the diffraction grating 23 at a different angle by wavelength is focused by the focusing lens 24 to any one of the tilt mirrors 25a through 25n of the corresponding channel in the integrated tilt mirror 25. The light reflected and deflected by the integrated tilt mirror 25 is converted again by the focusing lens 24 to parallel light, and then again input to the diffraction grating 23.

The incident angle of the light again incident to the diffraction grating 23 is reverse to the angle at the time of light distribution. Therefore, the dispersion angle by wavelength is cancelled out. Therefore, by controlling the angle of the integrated tilt mirror 25, a light outputting position with respect to the wavelength dispersion providing unit 3 (incident position of light to the wavelength dispersion providing unit 3) can be set for each channel. In the example shown in the drawing, with the plurality of tilt mirrors 25a through 25n provided to the integrated tilt mirror 25 being directed upward, the outputting position of the parallel light output from the diffraction grating 23 can be set upward. Also, with the plurality of tilt mirrors 25a through 25n provided to the integrated tilt mirror 25 being directed downward, the outputting position of the parallel light output from the diffraction grating 23 can be set downward.

With the structure described above, an optical path difference can be continuously provided between the short wavelength side and the long wavelength side in the wavelength range included in the channel.

Figure 4:
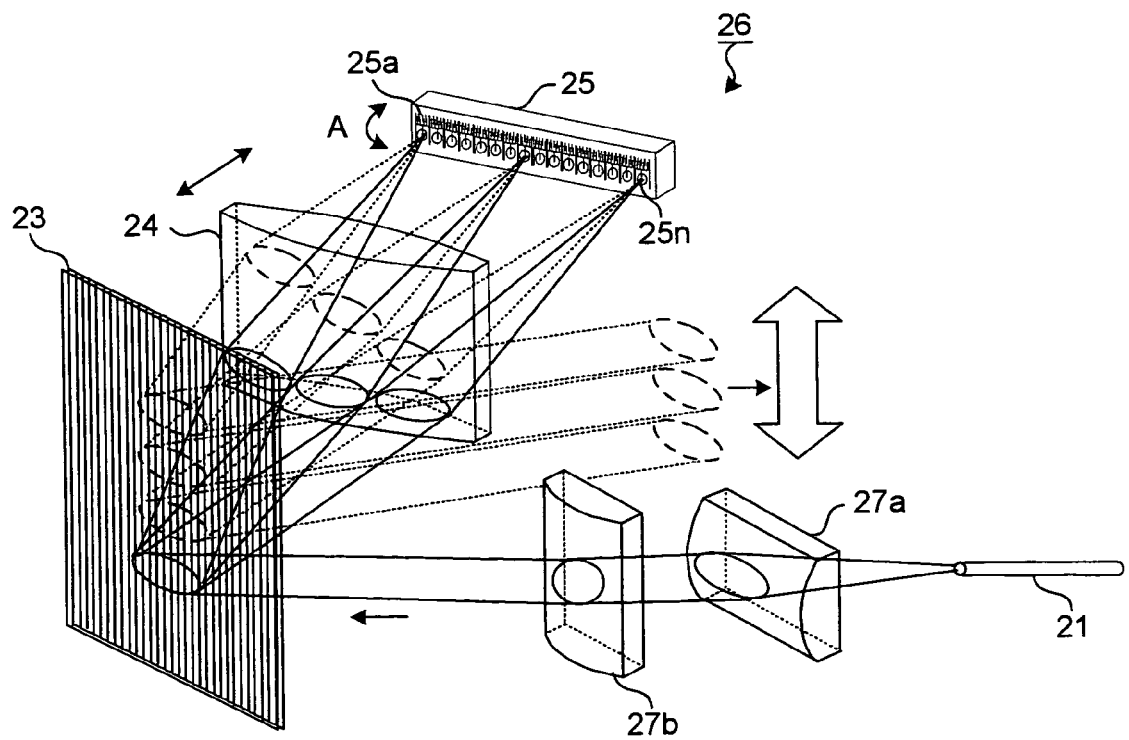
FIG. 4 is a perspective view of still another example of the compensation amount setting unit.

FIG. 4 is a perspective view of still another example of the compensation amount setting unit. A compensation amount setting unit 26 shown in FIG. 4 is an exemplary modification of the structure described by using FIG. 3, and components identical to those in FIG. 3 are provided with the same signs. This compensation amount setting unit 26 is structured so that a spot size (spot shape) of light on the mirror surface of the plurality of tilt mirrors 25a through 25n provided on the integrated tilt mirror 25 can be set to have an arbitrary shape.

In place of the collimate lens 22 described by using FIG. 3, two aspheric lenses or cylindrical lenses are combined. FIG. 4 depicts an example of the structure formed by combining two cylindrical lenses 27a and 27b. The cylindrical lens 27b can set a spot shape on each of the tilt mirrors 25a through 25n to an arbitrary size in a lateral direction (moving axis direction). Also, the cylindrical lens 27a can set a spot shape on each of the tilt mirrors 25a through 25n to an arbitrary size in a vertical direction (direction perpendicular to the moving axis direction).

Regarding the compensation amount setting direction (in the drawing, the vertical direction), a relation between a spot diameter ($\omega 3$) of the optical signal output from the compensation amount setting unit 26 and a compensation amount setting range is described. As the spot size is smaller with respect to the compensation amount setting range, a tunable range of the compensation amount can be set larger. This is equivalent to an increase in the number of discrete compensation values in the case of the structure that will be described further below show in FIG. 7.

Description is made by using the structure of FIG. 3. The spot size of the optical signal and the spot size on each of the tilt mirrors 25a through 25n for setting the amount of compensation have a relation in multiplication factor of the lens, that is, a relation in confocal is represented by $f2/f1=\omega 2/\omega 1$, where a focal length of the collimate lens 22 is f1, a focal length of the focusing lens 24 for gathering light to the tilt mirrors 25a through 25n is f2, a spot size of input light is $\omega 1$, and a spot size on the tilt mirrors 25a through 25n is $\omega 2$.

On the other hand, in the structure of FIG. 2, when the focusing lens 14 that gathers light to the tilt mirror 13 is designed at an infinite conjugate ratio, a spot size $\omega 3$ of the optical signal and the spot size $\omega 2$ on the tilt mirror 13 have a relation of $\omega 3 = \text{wavelength} \times f2/(\pi \times \omega 2)$.

Therefore, the spot size in the integrating direction (horizontal direction) on the integrated tilt mirror 25 as shown in FIGS. 3 and 4 is restricted due to crosstalk between adjacent channels. When the spot shape on the tilt mirrors 25a through 25n is a circle, $\omega 2$ is restricted and, consequently, $\omega 3$ is restricted. Therefore, to increase the amount of compensation for each channel, only a process of increasing a tilt angle of each of the tilt mirrors 25a through 25n is performed. In this case, restrictions of the tilt angle of the tilt mirrors 25a through 25n will apply.

To solve this problem, in the structure shown in FIG. 4, two cylindrical lenses 27a and 27b are used to change the spot shape on the integrated tilt mirror 25 to an arbitrary shape in the integrating direction (channel direction, the horizontal direction in the drawing) and the compensation amount setting direction (the vertical direction in the drawing).

With the structure described above, the setting range restricted by the tilt angle of each of the tilt mirrors 25a through 25n of the integrated tilt mirror 25 can be increased. Even without particularly providing a unit that increases the tilt angle of each of the tilt mirrors 25a through 25n of the integrated tilt mirror 25, the amount of compensation can be increased. Also, the spot size itself can be reduced to increase the amount of compensation. In this way, according to the structure described above, the compensation characteristic can be improved.

Figure 5A:
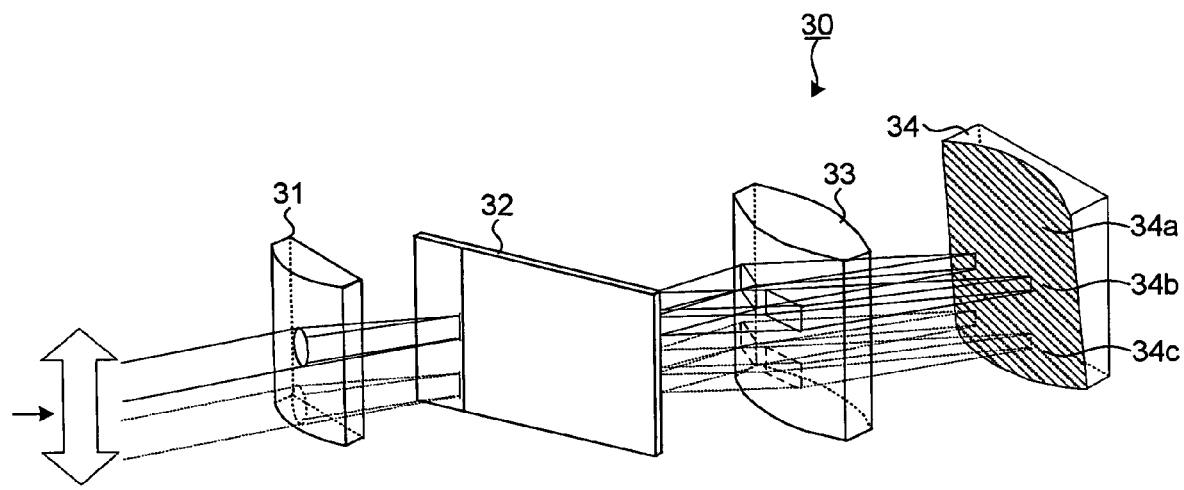
FIG. 5A is a perspective view of a first example of a wavelength dispersion providing unit.

FIG. 5A is a perspective view of a first example of a wavelength dispersion providing unit. The wavelength dispersion providing unit 30 includes a line focusing lens 31, a VIPA plate 32, a focusing lens 33, and a free surface mirror 34 whose reflection surface is a free surface.

Figure 5B:
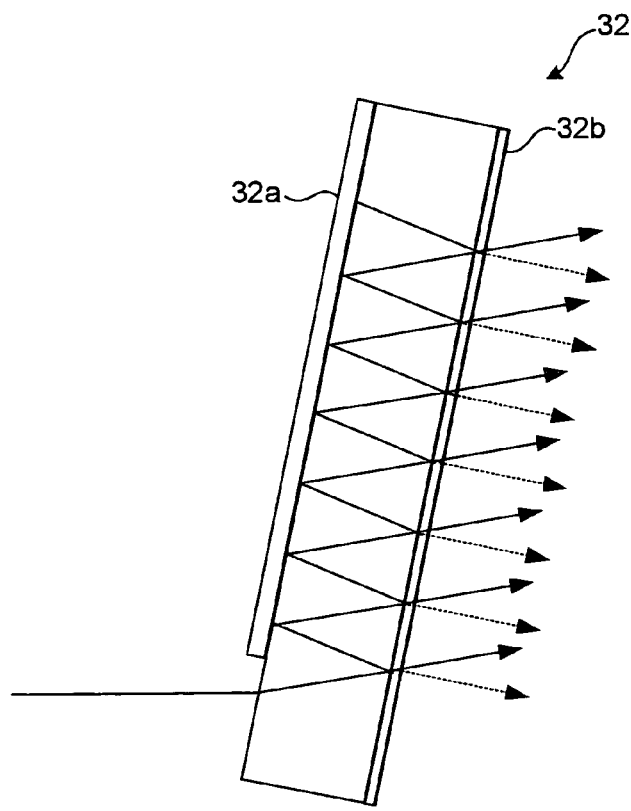
FIG. 5B is a side view of a VIPA plate.

FIG. 5B is a side view of a VIPA plate. The VIPA plate 32 includes a film 32a with a reflectivity of 100 percent and a film 32b placed in parallel light with a reflectivity of less than 100 percent, and performs light distribution though light multiple reflection between these two films 32a and 32b. This VIPA plate 32 causes light for each wavelength after light distribution to be output in the horizontal direction shown in FIG. 5A. The light at the long wavelength side is dispersed for output to a depth direction in the drawing, while the light at the short wavelength side is dispersed to a front direction in the drawing.

This VIPA plate 32 can be downsized and can also provide a large dispersion angle compared with other light distributing elements, such as a diffraction grating. Therefore, a large amount of compensation can be obtained while downsizing the entire optical system. The light output from the compensation amount setting unit 2 described above is input to the line focusing lens 31 from any of positions in the vertical direction shown in the drawing according to the set amount of compensation of wavelength dispersion. The line focusing lens 31 gathers light to the incident position of the VIPA plate 32. The VIPA plate 32 has light incident positions for a width of the VIPA plate (in the vertical direction in the drawing). The moving range of the light output from the compensation amount setting unit 2 corresponding to the amount of compensation is set based on the width of this VIPA plate 32, or the like.

The focusing lens 33 is an aspheric lens, and has a light focus on the free surface mirror 34 in the direction of dispersion by the VIPA plate 32. On the other hand, in a (vertical) direction perpendicular to the dispersing direction, there is no focus on the free surface mirror 34. The free surface mirror 34 has a concave surface 34a at the upper half portion of the reflection surface, a plane surface 34b at the center, and a convex surface 34c at the lower half portion. The concave portion 34a has a larger concave curvature at a more upper portion. The convex surface 34c has a larger convex curvature at a lower portion. In this way, with the light incident position being vertically varied, the free surface mirror 34 changes the light dispersed by the VIPA plate 32 in a range from a continuous concave shape to a continuous convex shape.

The free surface mirror 34 has a curved surface whose cross section parallel to the light distributing direction of the VIPA plate 32 continuously varies from a concave shape to a convex shape. Therefore, the light reflection angle with respect to the VIPA plate 32 can be changed according to the position of the incident light to the free surface. This makes it possible to change the amount of wavelength dispersion by changing the optical path length by wavelength.

Also, the focusing lens 33 having the structure described above is not implemented by a convex lens or the like symmetrical to the center of the lens. Instead, a lens (for example, a cylindrical lens) approximately having a focus on the free surface mirror 34 with respect to the light distributing direction of the VIPA plate 32 and not having a focus on the free surface mirror 34 with respect to the direction perpendicular to the light distributing direction is used. Therefore, light can be output to the free surface mirror 34 with a change in input position on the VIPA plate 32 being maintained in the direction (vertical direction in the drawing) perpendicular to the light distributing direction (the horizontal direction in the drawing) of the VIPA plate 32. This makes it possible to obtain the amount of compensation corresponding to different incident positions (in the vertical direction in the drawing) of the light output from the compensation amount setting unit 2.

As in the structure described above, by using the VIPA plate 32, which has large light angular dispersion, the wavelength dispersion providing unit 30 can be downsized compared with the structure using a diffraction grating.

Figure 6:
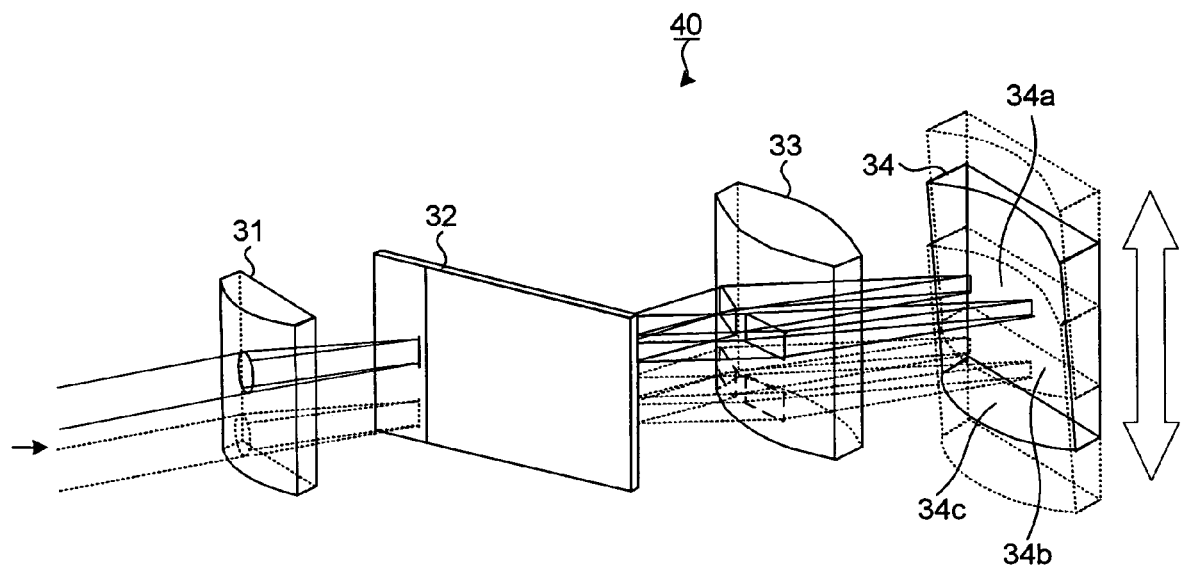
FIG. 6 is a perspective view of a second example of the wavelength dispersion providing unit.

FIG. 6 is a perspective view of a second example of the wavelength dispersion providing unit. In the wavelength dispersion providing unit 40, components identical to those described by using FIG. 5A are provided with the same signs. In this example of the structure, the free surface mirror 34 is shifted in parallel in a direction (vertical direction in the drawing) perpendicular to the light distributing direction of the VIPA plate 32. This translation is performed by using an automatic stage not shown or the like.

Figure 12:
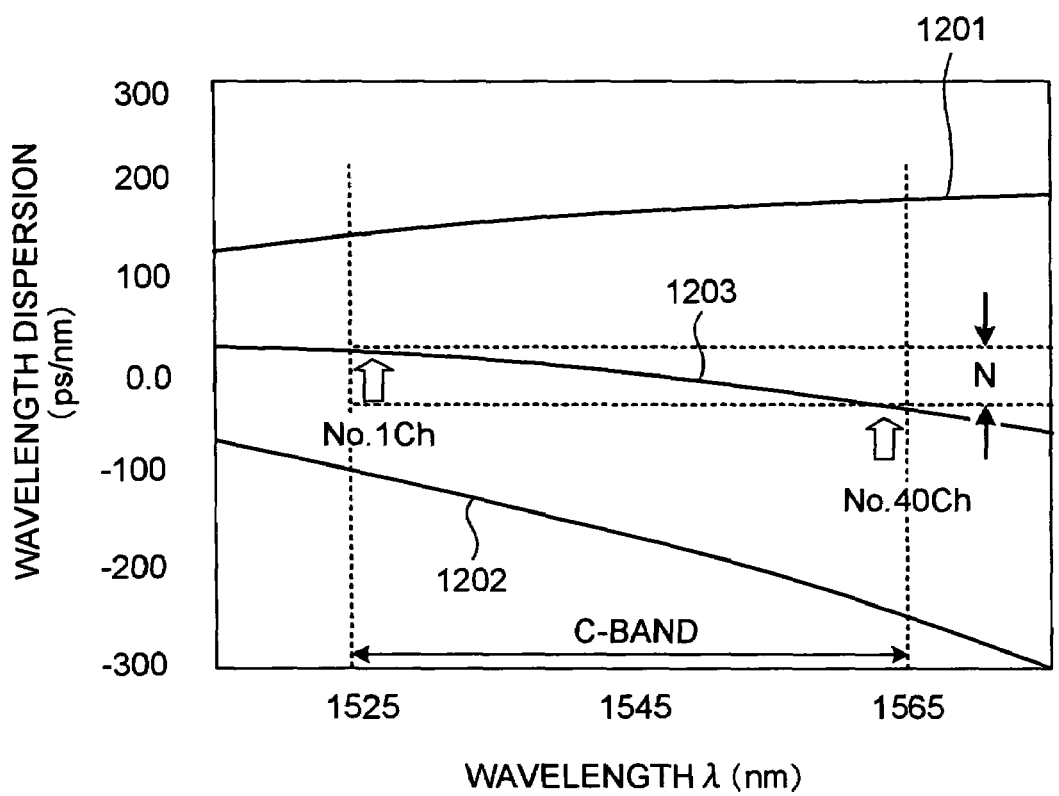
FIG. 12 is a graph for illustrating wavelength dispersion compensation and residual dispersion.
Figure 13:
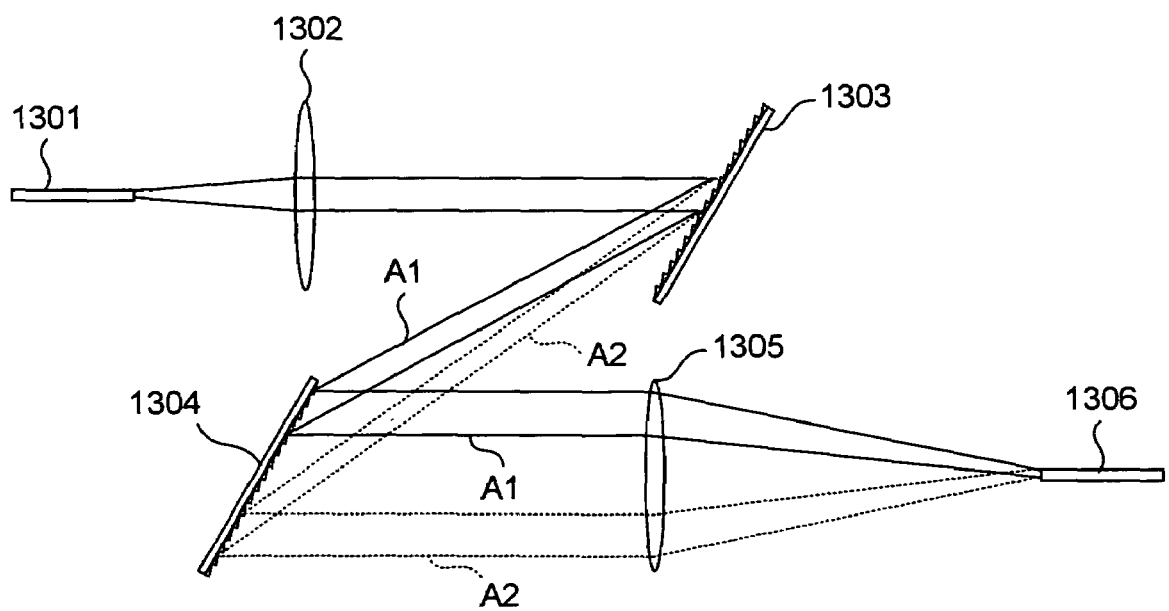
FIG. 13 is a schematic for illustrating a principle of the wavelength dispersion compensation using diffraction gratings.
Figure 14:
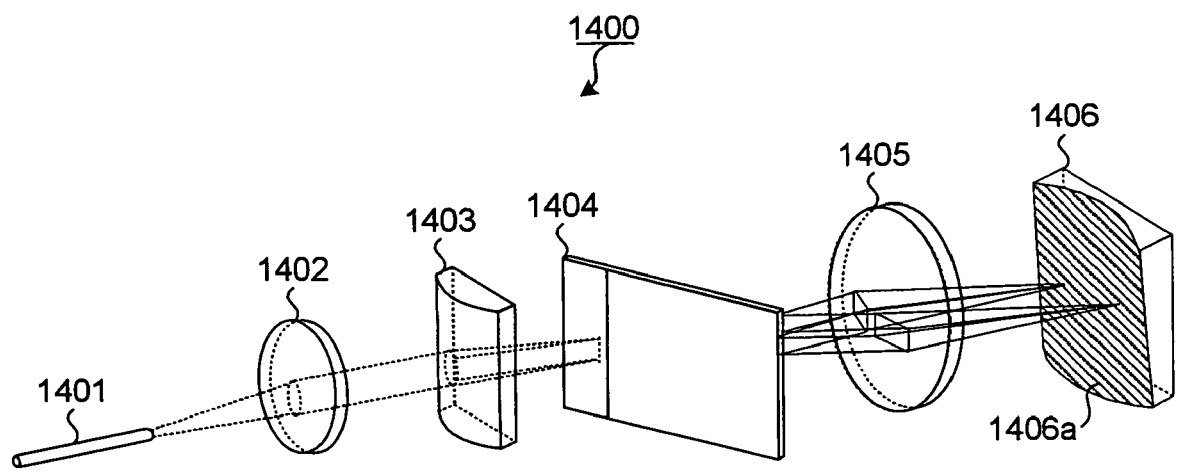
FIG. 14 is a perspective view of a tunable dispersion compensator according to a first example of the conventional technology.
Figure 15:
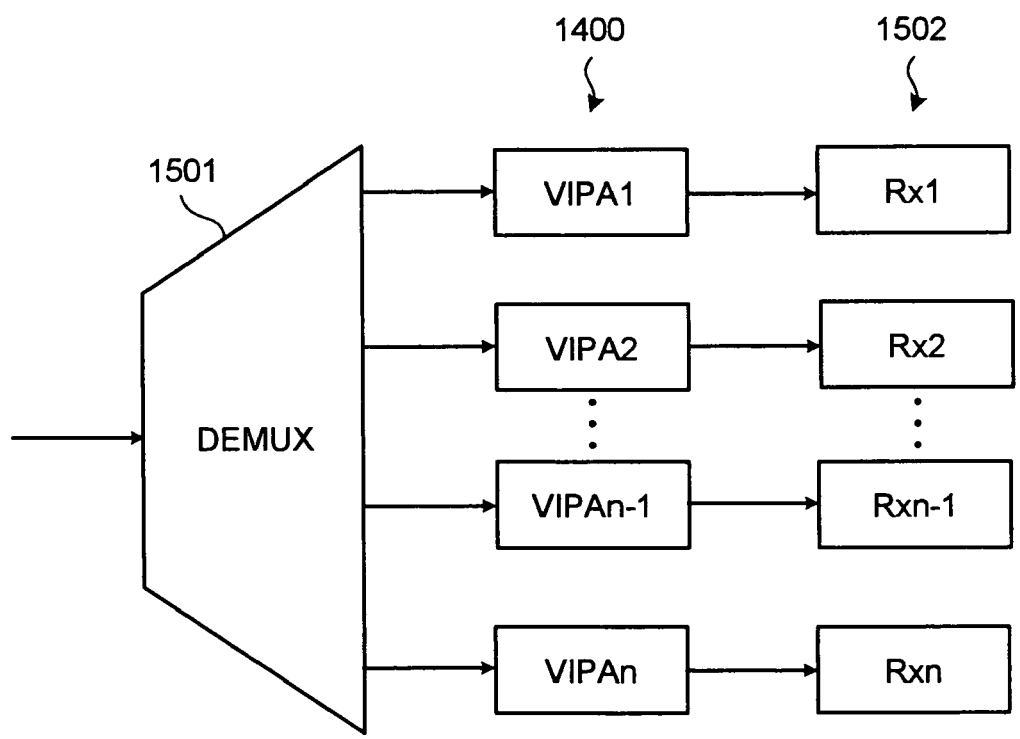
FIG. 15 is a schematic of an exemplary structure for achieving dispersion compensation of plural channels.
Figure 16:
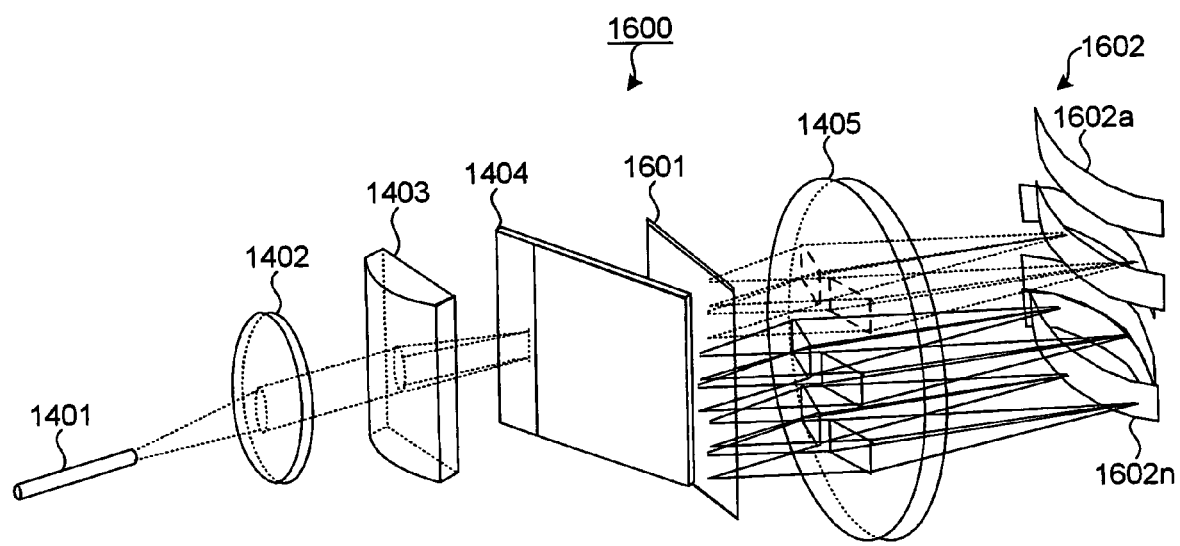
FIG. 16 is a perspective view of a tunable dispersion compensator according a second example of the conventional technology.

The free surface mirror 34 includes a concave surface 34a, a flat surface 34b, and a convex surface 34c each forming a cross section parallel to the light distributing direction (horizontal direction in the drawing) of the VIPA plate 32. By vertically moving this free surface mirror 34, the cross section parallel to the light distributing direction (horizontal direction in the drawing) of the VIPA plate 32 can be continuously varied from a concave shape to a convex shape. In this way, by vertically translating the optical path by the free surface mirror 34 provided to the wavelength dispersion providing unit 40 separately from a change in light incident position in the compensation amount setting unit 2, an absolute value (see FIG. 12) of the amount of compensation at the center wavelength in a wavelength range for use in the corresponding WDM optical signal transmission can be arbitrarily set. This makes it possible to further enrich dispersion compensation.

Next, still another exemplary structure of the above-structured wavelength dispersion providing units 3 (30, 40) is described. In the wavelength dispersion providing units 30 and 40 shown in FIGS. 5A and 6, the shape of the free surface mirror 34 is continuously changed, and therefore the reflecting directions are slight different from each other even in the same channel. As for the dispersing direction of the VIPA plate 32, the focusing lens 33 provided between the VIPA plate 32 and the free surface mirror 34 is designed at an infinite conjugate ratio, and each wavelength is returned again to the VIPA plate 32 at the same angle as the angle at which light is output from the VIPA plate 32.

On the other hand, in the direction perpendicular to the dispersing direction (in a direction in which the amount of dispersion compensation is changed, or in the vertical direction), the focusing lens 33 described above is not at the infinite conjugate ratio. Therefore, the light is returned to the VIPA plate 32 at an angle according to the variation in the curved surface. Such variation in the reflecting direction causes a change of the center wavelength, an increase in compensation, and the like. Since these problems depend on the degree of the curve of the free surface mirror 34, they can be suppressed by reducing the variations in the curved surface as much as possible in the direction in which the amount of compensation is changed. However, depending on the movement width of incident light with its height direction being changed based on the setting by the compensation amount setting unit 2, the amount of compensation may be restricted. A structure to mitigate such loss is described.

Figure 7:
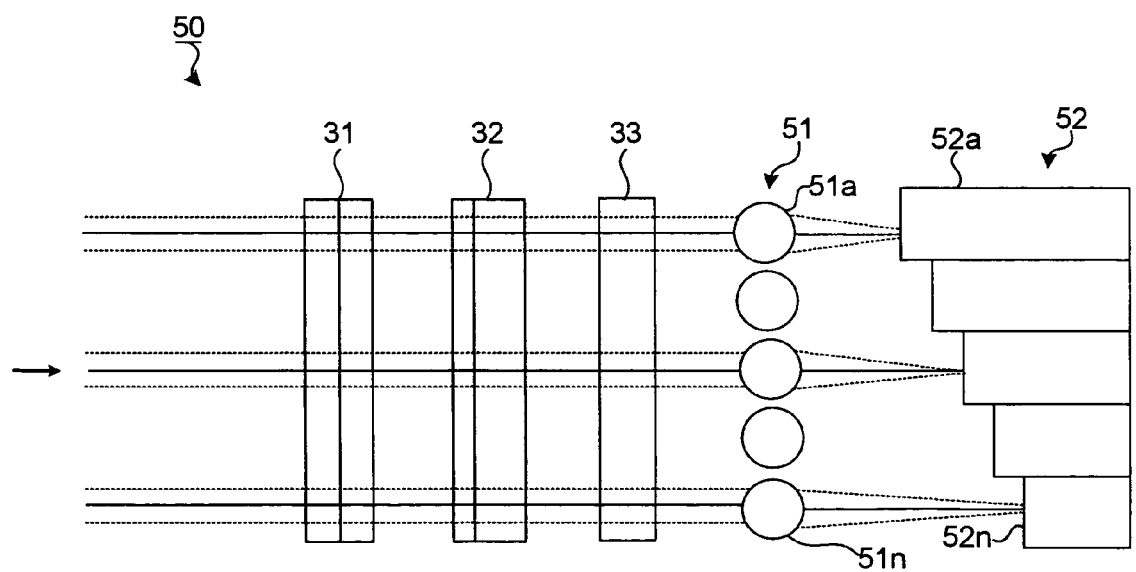
FIG. 7 is a side view of still a third example of the wavelength dispersion providing unit.

FIG. 7 is a side view of still a third example of the wavelength dispersion providing unit. In this wavelength dispersion providing unit 50, components identical to those described by using FIG. 5A are provided with the same signs. As shown in the drawing, cylindrical lenses 51 approximately having a focus on a free surface mirror 52 in a light distributing direction (a horizontal direction, or a depth direction in the drawing) of the VIPA plate 32 are used as focusing lenses forming this wavelength dispersion providing unit 50. Also, in a direction (vertical direction in the drawing) perpendicular to the light distributing direction of the VIPA plate 32, a plurality (51*a* through 51*n*) of cylindrical lenses 51 are provided correspondingly to the number of channels. Each cylindrical lens 51 has its own focus on the free surface mirror 52. Not only the cylindrical lenses 51 but also rod lenses can be used.

As shown in the drawing, the free surface mirror 52 is assumed to be a discontinuous free surface according to each lens width of a plurality of aligned cylindrical lenses 51 (51*a* through 51*n*), and is formed by, in the example shown in the drawing, a plurality of mirrors 52*a* through 52*n* vertically having steps. As shown in FIG. 5A, these mirrors 52*a* through 52*n* each have any one of a concave surface, a flat surface, and a convex surface in the width direction shown in FIG. 7. In this way, the free surface mirror 52 is formed by using the plurality of mirrors 52*a* through 52*n* that are discrete in a direction perpendicular to the light distributing direction of the VIPA plate 32, thereby setting the amount of compensation. That is, the angle of the curved surface mirror in a direction of setting the amount of compensation (vertical direction in the drawing) is not changed.

With this, as shown in FIG. 7, in the direction of setting the amount of compensation (vertical direction in the drawing), no shift occurs in the light reflecting direction with respect to the VIPA plate 32. Therefore, the above problems including a change in the center wavelength and an increase in loss can be solved. Also, a plurality of cylindrical lenses 51 (51*a* through 51*n*) corresponding to the number of compensation values are aligned in the direction (vertical direction in the drawing) perpendicular to the light distributing direction of the VIPA plate 32, and are an optical system that has a focus on each of the plurality of mirrors 52*a* through 52*n* discretely arranged. Therefore, interference among the compensation values can also be prevented, thereby improving the compensation characteristic.

Figure 8:
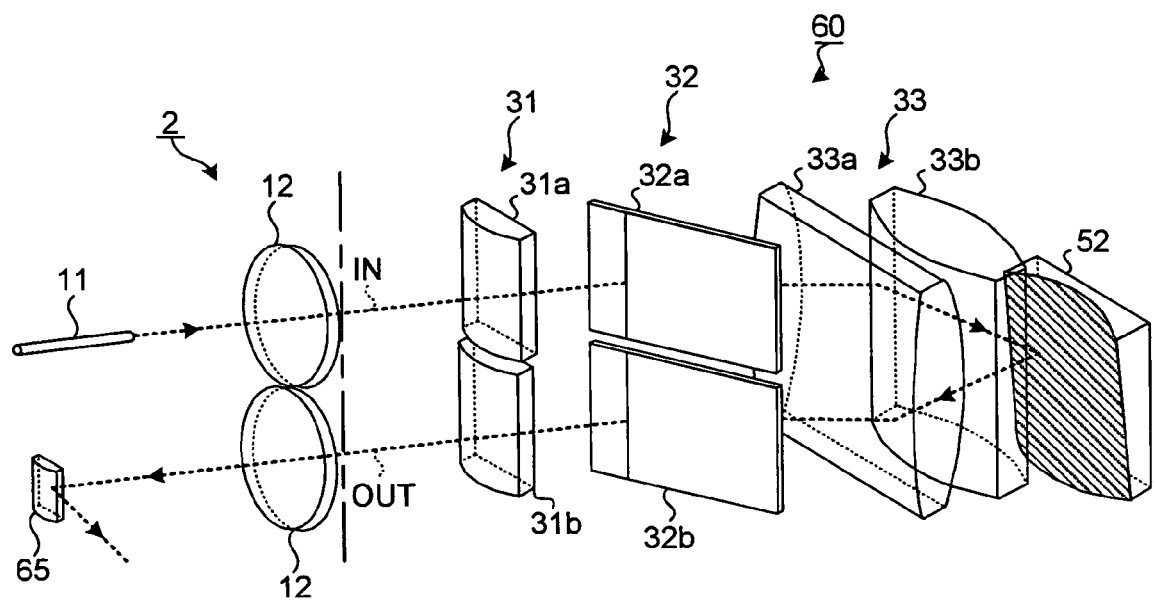
FIG. 8 is a perspective view of a fourth example of the wavelength dispersion providing unit.

FIG. 8 is a perspective view of a fourth example of the wavelength dispersion providing unit. A wavelength dispersion providing unit 60 shown in this drawing has a structure in which a light input side and a light output side are separated from each other. In the structure described by using FIG. 7, that is, when reflected light from the free surface mirror 52 is returned to the same optical system again, a change in the center wavelength, a loss (or restrictions to the amount of compensation), and the like occur. These problems can be solved by separating an optical path of light incident to the free surface mirror 52 and an optical path of light reflected by the free surface mirror 52 from each other.

Also, in FIG. 8, an optical path IN at a light incident side is provided upward, whilst an optical path OUT at a light outputting side is provided downward. The optical path IN at the light incident side and the optical path OUT at the light outputting side are each provided with the line focusing lens 31 (31*a*, 31*b*) and the VIPA plate 32 (32*a*, 32*b*). A focusing lens 33 includes a first focusing lens 33*a* provided in a preceding stage and a second focusing lens 33*b* provided in a subsequent stage. These first focusing lens 33*a* and second focusing lens 33*b* are both aspheric lenses.

Also, FIG. 8 depicts the structure of the compensation amount setting unit 2. The compensation amount setting unit 2 includes collimate lenses 12 and 12 provided to the optical paths IN and OUT at the light incident side and the light outputting side, respectively, an optical fiber 11 provided in the optical path IN at the light incident side, and a reflective mirror 65 provided to the optical path OUT at the light outputting side to cause light output from the wavelength dispersion providing unit 60 to be output in a predetermined direction.

The first focusing lens 33*a* tilts the light incident and outputting directions in the vertical direction so that light on the optical path IN at the light incident side and light on the optical path OUT at the light outputting side are combined by taking the free surface mirror 52 as a center. In FIG. 8, each optical path is drawn by a single line for convenience. However, the light focus position formed by the first focusing lens 32*a* is not on the reflection surface of the free surface mirror 52, but the focus is set so as to be formed in front of and behind this free surface mirror 52.

The second focusing lens 33*b* has a structure similar to that of the focusing lens 33 described by using FIG. 5A. This second focusing lens 33*b* has a focus of light in the direction in which light is dispersed by the VIPA plate 32 on the free surface mirror 52. On the other hand, in the direction (vertical direction) perpendicular to the light distributing direction, it is structured so as not to have a focus on the free surface mirror 52.

In the wavelength dispersion providing unit 60 having the structure described above, the optical path IN at the light incident side and the optical path OUT at the light outputting side are separated from each other. Therefore, focus adjustment can be performed at each of the light incident side and the light outputting side with respect to the free surface mirror 52, thereby correcting a shift in center wavelength. Also, the optical path OUT at the light outputting side can be placed at a position different from that of the optical path IN at the light incident side. Therefore, a loss can be mitigated inside the compensation amount setting unit 2. Furthermore, when an optical fiber with single light input and output (for example, the optical fiber 11 shown in FIG. 2) is used in the compensation amount setting unit 2, an optical circulator for separating light input and output from each other for the compensation amount setting unit 2 is required outside of the compensation amount setting unit 2. However, as shown in FIG. 8 described above, with the optical path IN at the light incident side and the optical path OUT at the light outputting side being separated from each other, a new circulator does not have to be provided (achieving a circulator-less device), thereby eliminating insertion loss that would be caused by a circulator.

By combining the compensation amount setting unit shown in any of FIGS. 2, 3, and 4 described above and the wavelength dispersion providing unit shown in any of FIGS. 5A, 6, 7, and 8, a tunable dispersion compensator can be structured. Exemplary structures are described.

Figure 9:
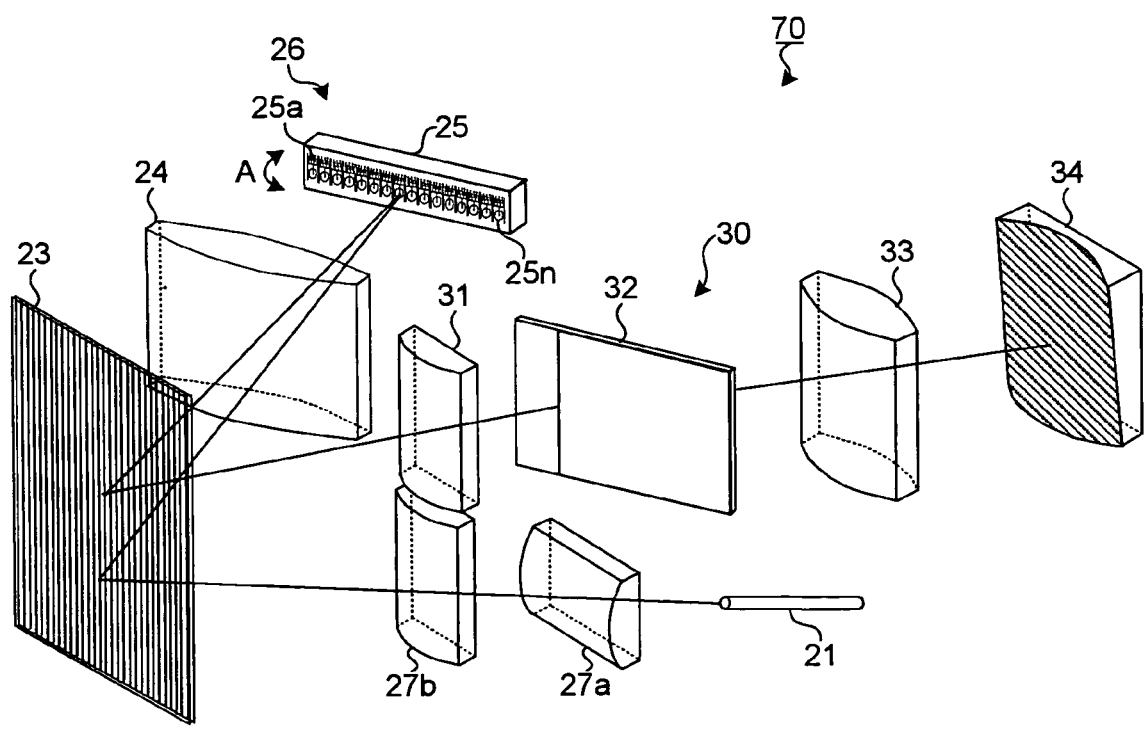
FIG. 9 is a perspective view of a first exemplary structure of the tunable dispersion compensator according to the present invention.

FIG. 9 is a perspective view of a first exemplary structure of the tunable dispersion compensator according to the present invention. A tunable dispersion compensator 70 shown in FIG. 9 has an exemplary structure in which the compensation amount setting unit 26 shown in FIG. 4 and the wavelength dispersion providing unit 30 shown in FIG. 5A are combined. As shown in the drawing, the structure is formed by the compensation amount setting unit 26 including the integrated tilt mirror 25, the diffraction grating 23, the focusing lens 24 designed at an infinite conjugate ratio, and a collimate lens (two cylindrical lenses 27a and 27b) that causes a spot shape on the integrated tilt mirror 25 to be an oval, and the wavelength dispersion providing unit 30 including the VIPA plate 32, the free surface mirror 34, etc. As shown in the drawing, by vertically arranging the compensation amount setting unit 26 and the wavelength dispersion providing unit 30 with one end being at a position at which the diffraction grating 24 (translator's comment: 23) is placed, the entire tunable dispersion compensator 70 can be downsized.

Figure 10:
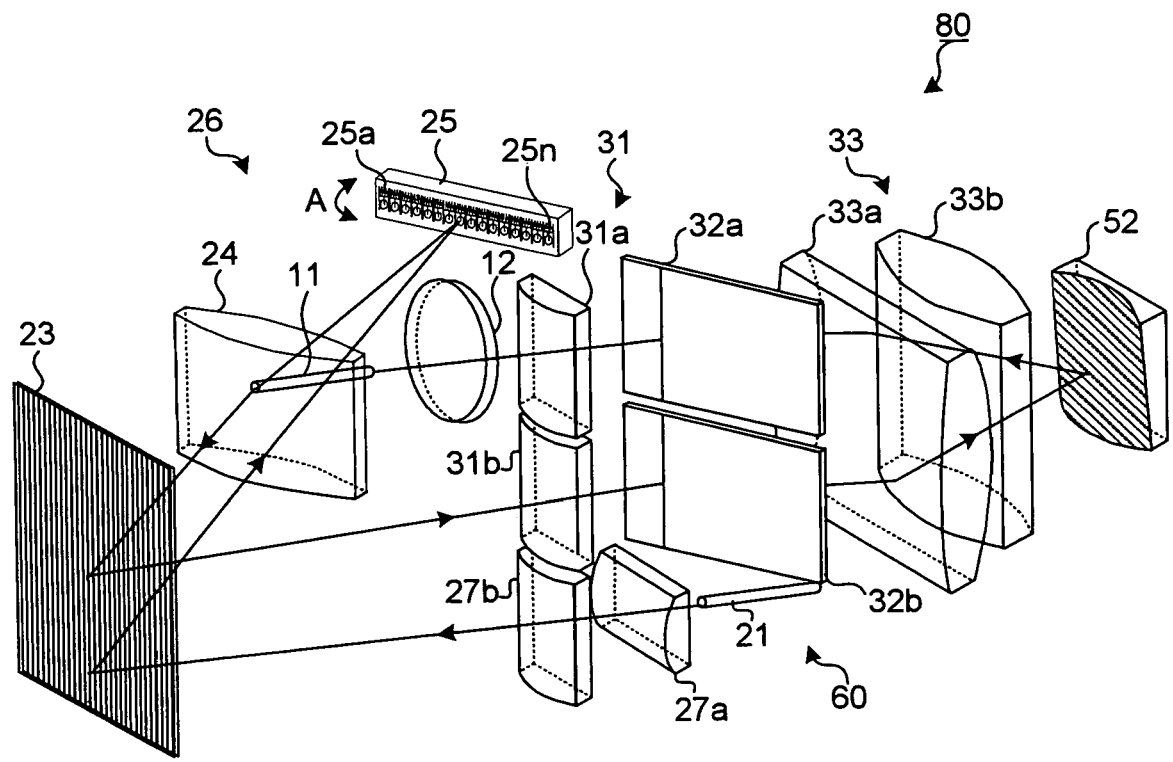
FIG. 10 is a perspective view of a second exemplary structure of the tunable dispersion compensator according to the present invention.

FIG. 10 is a perspective view of a second exemplary structure of the tunable dispersion compensator according to the present invention. A tunable dispersion compensator 80 shown in FIG. 10 has an exemplary structure in which the compensation amount setting unit 26 shown in FIG. 4 and the wavelength dispersion providing unit 60 shown in FIG. 8 are combined. Also, the compensation amount setting unit 26 includes a collimate lens (two cylindrical lenses 27a and 27b) that causes a spot shape on the integrated tilt mirror 25 to be an oval. As shown in the drawing, by vertically arranging the compensation amount setting unit 26 and the wavelength dispersion providing unit 60 with one end being at a position at which the diffraction grating 23 is placed, the entire tunable dispersion compensator 80 can be downsized. Also, the optical fiber 11 at the input side and the optical fiber 21 at the output side can be separately provided.

In recent years, also with the rapid increase in communication demands, more flexible communication services (for example, at the time of primary (translator's comment: temporary) increase in communication capacity) at lower price have been desired. To cope with this, in a future communication system, it is required that an increase in capacity be handled with minimum new equipment investment and suppressed operation cost.

To do this, firstly, the existing optical fiber network is used. Secondly, in end-to-end communication, relay with an expensive optical-electrical signal converter is not performed, but an optical signal is transmitted as it is. Thirdly, the communication capacity for each route in a network is optimally set on a real time basis. These requirements have to be satisfied. The first and second requirements are effective in suppressing equipment investment cost at the time of constructing the network, whilst the third requirement is effective in improving use efficiency of the network and suppressing operation cost for management at the time of route failure.

As for the first requirement, WDM transmission has attracted attention and become increasingly available, in which optical wavelengths are multiplexed with a single optical fiber for multiple channel transmission. As for the second and third requirements, based on WDM transmission, an optical switching device that performs destination distribution at a connecting point (relay node) of the network by wavelength (channel) has been discussed.

The first through third requirements described above are achieved by WDM transmission being performed on an end-to-end basis in a meshed optical fiber network and its route being set flexibly with time. Such a network is called a reconfigurable WDM network.

Figure 11:
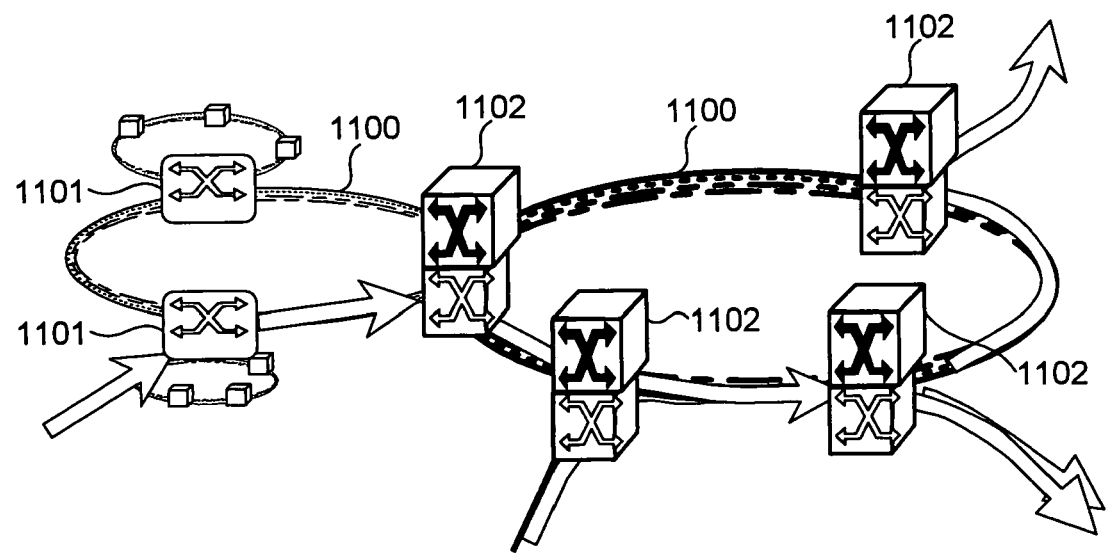
FIG. 11 is a schematic of a reconfigurable optical network.

FIG. 11 is a schematic of a reconfigurable optical network. A ring-shaped network 1100 includes, as optical switching devices, an optical add/drop multiplex (ADM) 1101 that performs optical branching/insertion of a wavelength-multiplexed optical signal as it is and an optical switch 1102. With these components, a low-delay ring network at low cost can be provided. To achieve a reconfigurable optical network or a reconfigurable WDM network, not only the optical switching devices but also wavelength dispersion compensation corresponding to different fibers for different wavelengths and routes is required. Furthermore, as to requests for failure recovery of the network and future increase in transmission speed (for example, 40 Gb/s or higher), the amount of dispersion compensation is desired to be set at high speed. According to the tunable dispersion compensator of the present invention, such dispersion can be achieved for each wavelength (each channel) further with residual dispersion being suppressed.

As has been described in the foregoing, according to the tunable dispersion compensator of the present invention, a small-sized tunable dispersion compensator that allows the amount of compensation to be set at high speed for each channel can be economically achieved with a single module. Also, in an optical transmission network where the entire end-to-end being highly-meshed with a large capacity, it is possible to solve a problem of dispersion compensation occurring when the existing optical fiber using WDM transmission and a newly-installed optical fiber are mixed, thereby allowing an economical system to be constructed.

According to the tunable dispersion compensator of the present invention, it is possible to achieve effects such that the amount of compensation can be quickly set while the reliability of the compensation characteristic of wave dispersion is ensured, and wavelength dispersion compensation can be performed with a single small-sized module.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A tunable dispersion compensator, comprising:
    a collimating unit that collimates an incident light to output a parallel light;
    a parallel light shifting unit that spatially separates the parallel light from the collimating unit into a plurality of channel lights that are parallel to one another; and
    a wavelength dispersion providing unit that includes a mirror for compensation of wavelength dispersion of the channel lights, wherein:
    the parallel light shifting unit outputs the channel lights in such a way that the channel lights are incident on and reflected at different points on a surface of the mirror, and
    the wavelength dispersion providing unit further includes a spectroscoiic unit that spatially separates each of the channel lights, which are input from the parallel light shifting unit via a first lens, and outputs each of the channel lights to the mirror via a second lens.

2. The tunable dispersion compensator according to claim 1, wherein the parallel light shifting unit further comprises:
    a first focusing lens portion that focuses the parallel light from the collimating unit;

a tilt mirror that has a mirror surface at a distance of a focal length of The first focusing lens portion, tilting of the mirror surface changing a direction of light reflection by the mirror surface according to a desired amount of compensation for wavelength dispersion; and a second focusing lens portion that collimates light reflected by the tilt mirror.

3. The tunable dispersion compensator according to claim 2, wherein the collimating unit further comprises:

a first collimating lens that sets a diameter, in a first direction, of a spot size of light on the mirror surface; and a second collimating lens that sets a diameter, in a second direction perpendicular to the first direction, of the spot size of light on the mirror surface.

4. The tunable dispersion compensator according to claim 3, wherein:

the first direction is a direction of movement of the tilt mirror.

5. The tunable dispersion compensator according to claim 2, wherein:

the first focusing lens portion and the second focusing lens portion are respective, first and second different portions of a single focusing lens, and the parallel light from the collimating unit and the light reflected by the tilt mirror pass through respective, different portions of the single focusing lens.

6. The tunable dispersion compensator according to claim 2, wherein:

the mirror surface is rotatable around an axis, and the tilt mirror rotates the mirror surface at an angle corresponding to a desired compensation amount for the wavelength dispersion.

7. The tunable dispersion compensator according to claim 1, further comprising:

a spectroscopic unit that separates wavelength components of the parallel light from the collimating unit;

a focusing lens that focuses each of lights of different wavelengths, separated by the spectroscopic unit, on a different position; and an integrated tilt mirror that has a mirror surface at a distance of focus of each of the lights of different wavelengths, and changes an angle of a corresponding mirror surface thereof according to a desired amount of compensation for wavelength dispersion of a desired wavelength, wherein:

light reflected by the integrated tilt mirror is output as parallel light via the focusing lens and the spectroscopic unit from a position within a predetermined range corresponding to the amount of compensation for the wavelength dispersion.

8. The tunable dispersion compensator according to claim 7, wherein the collimating unit includes:

a first collimating lens that sets a diameter, in a first direction, of a spot size of light on the mirror surface; and a second collimating lens that sets a diameter, in a second direction perpendicular to the first direction, of the spot size of light on the mirror surface in a second direction.

9. The tunable dispersion compensator according to claim 8, wherein the first direction is a direction of movement of the tilt mirror.

10. The tunable dispersion compensator according to claim 1, wherein the spectroscopic unit receives the channel lights reflected from the mirror via the second lens, and outputs the channel lights to the parallel light shifting unit via the first lens.

11. The tunable dispersion compensator according to claim 1, wherein the spectroscopic unit is a virtually imaged, phased array.

12. The tunable dispersion compensator according to claim 1, wherein:

the second lens has a focus on the surface of the mirror along a spectroscopic direction of the spectroscopic unit, and does not have a focus on the surface of the mirror along a direction perpendicular to the spectroscopic direction.

13. The tunable dispersion compensator according to claim 12, wherein:

the wavelength dispersion providing unit further comprises a third lens arranged between the spectroscopic unit and the second lens.

14. The tunable dispersion compensator according to claim 1, wherein:

the mirror has a continuous variation in a direction perpendicular to a spectroscopic direction of the spectroscopic unit; and the wavelength dispersion unit further includes a shifting unit that shifts the mirror in the direction perpendicular to the spectroscopic direction.

15. The tunable dispersion compensator according to claim 1, wherein:

the wavelength dispersion providing unit further includes a group of lens elements respectively having focuses on the mirror surface along a spectroscopic direction of the spectroscopic unit, the lens elements being aligned in a direction perpendicular to the spectroscopic direction, and the mirror includes steps aligned with a width corresponding to a lens width of each of the lens elements, each of the steps having respective, different distances from the group of lens elements.

16. A tunable dispersion compensator according to claim 1, wherein each of the collimating unit, the parallel light shifting unit and the wavelength dispersion providing unit define corresponding portions of an optical light path to which the light, as processed by the respective units, propagates.

* * * * *

UNITED STATES PATENT AND TRADEMARK OFFICE
CERTIFICATE OF CORRECTION

PATENT NO. : 7,231,111 B2 Page 1 of 1
APPLICATION NO. : 10/899003
DATED : June 12, 2007
INVENTOR(S) : Kohei Shibata It is certified that error appears in the above-identified patent and that said Letters Patent is hereby corrected as shown below:

First Page, Column 2 (Other Publications), Line 1, change "Neislon" to --Neilson--.

Column 14, Line 60, change "spectroscoiic" to --spectroscopic--.

Column 15, Line 2, change "The" to --the--.

Signed and Sealed this

Thirtieth Day of October, 2007

JON W. DUDAS
*Director of the United States Patent and Trademark Office*